May 24, 1960     J. H. BARNES     2,937,904
UNITARY TRIM MEMBER AND SECURING RING
Filed Dec. 20, 1956     2 Sheets-Sheet 1
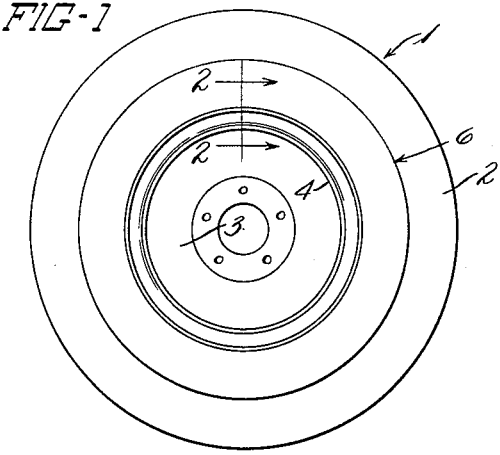
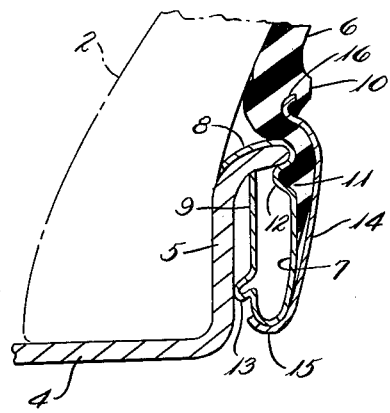
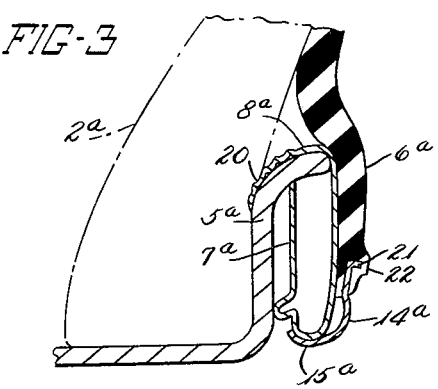
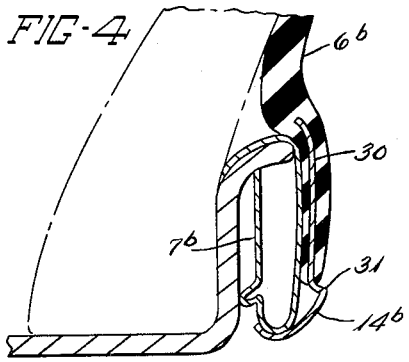
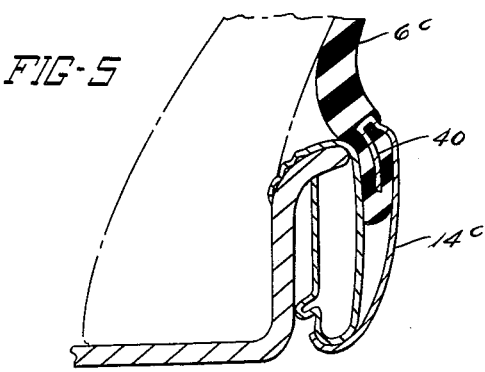
INVENTOR.
JAMES H. BARNES
BY Oldham & Oldham
ATTYS.

May 24, 1960 J. H. BARNES 2,937,904
UNITARY TRIM MEMBER AND SECURING RING
Filed Dec. 20, 1956 2 Sheets-Sheet 2
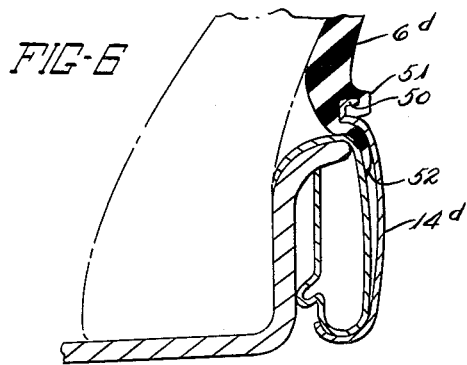
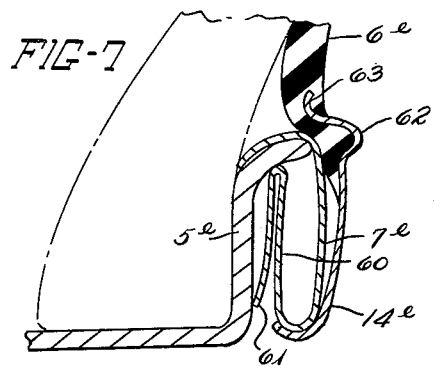
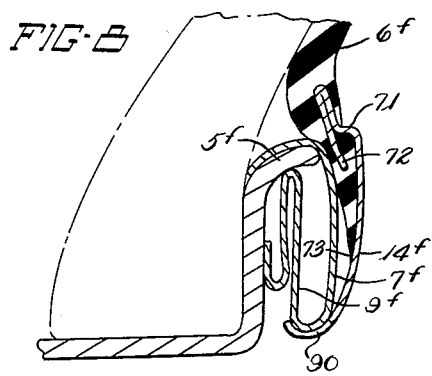
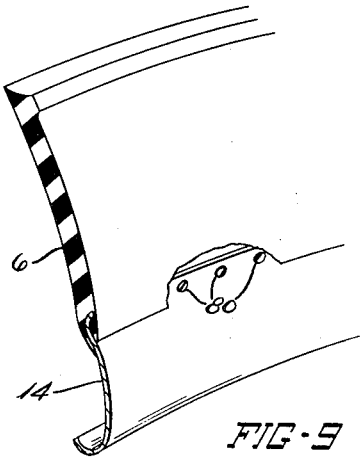
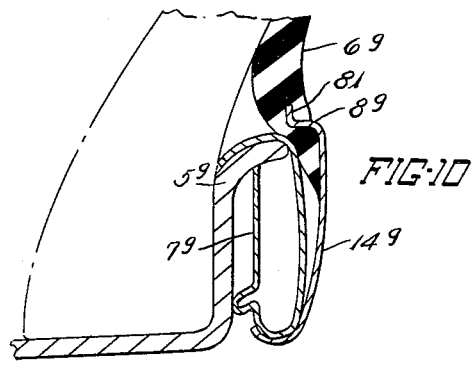
INVENTOR.
JAMES H. BARNES
BY Oldham & Oldham
ATTYS.

United States Patent Office 2,937,904
Patented May 24, 1960

2,937,904

UNITARY TRIM MEMBER AND SECURING RING

James H. Barnes, Wadsworth, Ohio, assignor to Edward L. Wood, Detroit, and Charles B. Aske, Jr., Birmingham, Mich.

Filed Dec. 20, 1956, Ser. No. 629,691

9 Claims. (Cl. 301—37)

This invention relates to trim members for pneumatic tires, especially to a unitary trim member and securing or anchoring ring therefor.

The present invention relates to trim members of the general type covered in my previously issued Patent No. 2,737,422. The present invention relates to an altered and improved type of a structure wherein it is possible to assemble a trim member and anchor ring unit therefor onto the lateral margins of a pneumatic tire and wheel assembly and have the trim member extend radially alongside the tire sidewall for protecting and decorating the tire assembly.

The general object of the present invention is to provide a new and improved type of a trim member assembly for pneumatic tires characterized by the unitary construction of the trim member and the anchoring ring or securing ring therefor.

Another object of the invention is to provide a trim and decorative member assembly for pneumatic tire units wherein the trim and decorative member or unit is made from a minimum number of independent parts and wherein the assembly of such decorative unit upon a tire assembly is facilitated and simplified.

Another object of the invention is to provide a novel and improved type of a trim member means for use with pneumatic tire and wheel assemblies, which trim member means simulates a smaller diameter tire than that tire assembly to which the trim unit is secured.

A further object of the invention is to provide a mechanical and/or chemical interlock between some style of a resilient trim member and a metal or other type of an anchor ring therefor whereby the operative positioning of the trim member on a tire assembly is facilitated and the trim member is given a more positive, tighter engagement with the wheel assembly.

Yet another object of the invention is to provide a new and improved style of clip means used for engaging a tire rim flange to aid in securing an anchor ring and trim member unit thereto.

Still another object of the invention is to provide an anchor ring member in apparatus of the class described wherein the anchor ring can be made, for example, from metal strips by rolling operations.

A further object of the invention is to provide a novel and improved clip means in apparatus of the type described wherein the clip member is provided with corrugations or other rib means thereon to facilitate retention of the clip in engagement with a tire and rim assembly.

Other objects of the invention are to provide an anchor ring of minimum radial length for trim member assemblies, and to provide retortly directed sections in an anchor ring to obtain a strong mechanical bond between the anchor ring and a trim member molded integrally about such section of the anchor ring.

Yet another object of the invention is to provide an annular anchor ring for use in apparatus of the class described, wherein the anchor ring has a plurality of circumferentially spaced splits in the radially inner edge thereof to facilitate snapping or springing the anchor ring over anchor clips operatively engaged with the wheel rim flange and extending radially inwardly therefrom.

The foregoing and other objects and advantages of the invention will be made more apparent as the specification proceeds.

Reference now should be had to the accompanying drawings which illustrate some of the currently preferred embodiments of the present invention, and wherein:

Fig. 1 is an elevation of a tire and wheel assembly having a trim and decorative unit embodying the principles of the invention operatively secured thereto;

Fig. 2 is an enlarged fragmentary, vertical section taken on line 2—2 of Fig. 1;

Figs. 3 and 4 are vertical sections similar to Fig. 2, of modified embodiments of the invention and wherein a reduced diameter tire unit is simulated by the operative assembly;

Figs. 5 through 8 are further fragmentary vertical sections, similar to Fig. 2, of further modified embodiments of the invention;

Fig. 9 is a fragmentary perspective and end sectional view, partially broken away, to show the mechanical interlock and bonding engagement between the trim member and the anchor ring or securing ring therefor; and Fig. 10 is a vertical section, like Fig. 2, of a further modification of a trim member assembly of the invention.

When referring to corresponding parts shown on the drawings and referred to in the specification, corresponding numerals are used to facilitate comparison therebetween.

When using the words "rim," "flange," "wheel flange" and "rim flange" in this application, the words are used in a broad sense and are designed to cover wheel flanges whether made separately from a vehicle wheel, as in a separate rim, or whether the rims and rim flanges would be integral portions of the vehicle wheels, as is customary in most passenger tire constructions today. The construction of the invention can be used with either tubed, or tubeless tires, as desired.

The trim members of the invention may be made from any suitable resilient materials, such as natural rubber, or synthetic rubber or rubber-like materials and from other plastic materials generally, including vinyl plastic materials and polymers, or copolymers thereof. Hence, the word "plastic" is used broadly in the specification and claims to refer to members made from any of such substances.

In practice of the present invention, it is permissible to use any desired types of positioning clips for aiding the positioning of resilient trim members and anchoring or securing rings therefor on the tire and rim assembly. Types of such clips are shown in my previously filed patent applications, Serial Nos. 586,558, filed May 22, 1956, now Patent No. 2,915,335, and 594,804, filed June 29, 1956.

The present invention, in effect, comprises a continuation-in-part application of my earlier filed U.S. applications, Serial No. 611,945, filed Sept. 25, 1956, and Serial No. 623,644, filed November 21, 1956, as both of such applications show other types of inter-engaging means provided between the trim member and anchor or securing rings therefor in assemblies like that disclosed herein.

The present invention, generally speaking, relates to apparatus for decorating and protecting tire sidewalls in a tire and wheel assembly. This apparatus comprises a plurality of clips having overhanging top flanges thereon for engaging a wheel flange to extend generally radially inwardly therefrom, a resilient trim member for engaging a tire sidewall and an anchor ring having an axially inwardly extending radially inner section for engaging the radially inner ends of these clips when operatively positioned on a wheel flange for securing the anchor ring thereto. The anchor ring extends radially outwardly from the inner ends of the clips and engages and positions the trim member so that it will remain in resilient or hugging engagement with the tire sidewall. Preferably the anchor ring and trim member form a unit for association with a tire and wheel assembly.

For a better understanding of the present invention, reference now should be had to the details of the structure shown in the accompanying drawings and wherein Fig. 1 indicates a tire and wheel assembly as a whole by the numeral 1. This wheel assembly has the novel trim member means of the invention secured thereto. The assembly includes a conventional pneumatic tire 2 which is positioned upon a standard wheel 3. This wheel 3 is of the type that has a conventional integral rim 4 with a rim or wheel flange 5 provided thereon.

Means are provided by the invention for positioning a resilient trim member or removable sidewall 6 so that it is resiliently urged against the sidewall of the tire 2. Fig. 2 of the drawings best shows the trim member 6 and how it is positioned by means of a plurality of clips 7, which may be made from metal, and which have overhanging edge flanges 8 thereon and axially inner walls 9. The clips 7 are so constructed that they can be pounded or otherwise forced into engagement with the edge of the flange 5 to move the radially outer flange 8 over the radially outer surface of the wheel flange 5. The radially outer end of the inner wall 9 of the clips engage the radially inner wall of the wheel flange 5 to aid in positioning the clips. These clips 7 will retain a given position and usually a plurality, such as about 5 or 6, of the clips 7 are positioned at substantially circumferentially evenly spaced portions around the periphery of the wheel 3 to extend radially inwardly of the terminal edge of the flange 5 on the axially outer surface thereof for a purpose to be hereinafter described.

As one feature of this construction of the invention, the trim member 6 has an axially outwardly directed rib 10 on a radially inner portion thereof adjacent the wheel flange 5, whereas the trim member 6 is partially held in engagement with the wheel flange 5 by means of an axially inwardly extending bead 11 formed on the axially inner surface of the trim member. The bead 11 is adapted to engage in under this wheel flange 5 at the outer edge thereof when the trim member is operatively positioned. The clips 7 have recesses 12 provided therein for receiving the rib 11 therein as this facilitates obtaining a snug, attractive engagement between the trim member 6, the clip 7 and the associated flange and tire means.

In order to provide slight resiliency in the axially inner walls 9 of the clips 7, they may have a U-shaped extension 13 provided therein, as best shown in Fig. 2 of the drawings, although other types of means can be used for providing this resiliency in the clip member, as desired.

An anchor ring of the invention is shown at 14 in Fig. 2. This anchor ring may be considered to be of flattened C-shape in section and it has a radially inner end section 15 of arcuate shape in section. The end section 15 bends around to extend radially outwardly at its terminal portion so that the net internal diameter of the anchor ring 14 at the terminal portion of the inner end section 15 thereof is less than the diameter of the circle defined by the inner ends of the plurality of clips 7 when operatively engaged with the wheel flange 5 at spaced portions thereof. Thus this inner end 15 of the anchor ring 14 is provided with slight resiliency inherently by its construction (shape and material) so that the inner end section 15 can be sprung or snapped over into engagement with the inner edges of the clips 7 and operatively secure the anchor ring 14 on such clips when they are engaged with the flange 5. The anchor ring 14 may be made in any desired manner and may be rolled from metal or metallic materials, as desired. However, the anchor ring 14 may be molded from a plastic material, such as polyethylene or the like, so as to give strength and a flexible shape to the anchor ring 14. At its radially outer end, the anchor ring 14 is provided with a curved edge flange 16 that is completely embedded in the material forming the trim member 6. Hence, the flange 16 will be at least mechanically bonded to the trim member 6 as the trim member normally would be molded integrally with the anchor ring 15 which would be previously formed prior to producing the trim member 6. The anchor ring 14 would be suitably positioned in a mold or other member in which the trim member 6 is produced. If desired, this flange 16 may have a plurality of holes, slots or apertures therein to have the material forming the trim member extend through such holes to give a mechanical interlock between the trim member and the anchor ring. However, if the anchor ring is made from metal, such metal can be conventionally processed so as to have the trim member 6 mechanically, or chemically bonded and/or vulcanized thereto. The anchor ring 14 could be cemented to the trim member 6 should the trim member be molded to proper shape for engaging the flange 16 therewith. Preferably the interlock between the anchor ring and trim member is secured by some type of a molding operation when the trim member 6 is formed.

In Fig. 3, clips 7a are shown and they have corrugated or ribbed sections 20 provided thereon at the ends of the overhanging edge flanges 8a. Such end sections 20 aid in getting tight engagement of the clips 7a on the flange 5a to which they are secured. A bead portion of the tire 2a engages such corrugated ends 20 to aid in holding the clips fixedly on a wheel and tire assembly. As an important feature of the structure shown in Fig. 3, this trim member 6a extends radially inwardly of the wheel assembly beyond the margin of the flange 5a to endeavor to create the appearance of a tire having a smaller diameter than the tire in the wheel assembly shown. To this end, an anchor ring 14a is provided and it has an inner end 15a for engaging the radially inner ends of the clips 7a, but such anchor ring only extends a short distance radially outwardly of the clips 7a and terminates in an axially outwardly directed edge flange 21 that preferably is embedded in the trim member 6a of the invention. Hence, only a very narrow radially extending portion of the anchor ring 14a remains exposed to view in this embodiment of the invention. Thus the ring is of minimum size and cost but yet an improved and novel assembly and ornamental appearance has been provided in the assembly thereby. A rib 22 is provided on the trim member 6a at the flange 21 for decorating and reenforcing action.

Fig. 4 shows yet a further embodiment of the invention wherein a trim member 6b is shown that extends radially inwardly of the tire and wheel assembly substantially the same distance as the structure shown in Fig. 3. However, in this instance, an anchor ring 14b is provided that has a radially outwardly extending section 30 thereon which normally is embedded in the radially inner edge portion of the trim member 6b. Trim member 6b extends radially inwardly alongside the clips 7b in this embodiment of the invention. Any suitable style of a clip member may be used, and preferably some type of a mechanical or chemical interlock or bond is provided intermediate the trim member 6b and anchor ring 14b so that an integral or unitary assembly thereof is provided which facilitates the assembly or positioning of the trim member unit on a tire and wheel assembly. A shoulder 31 is provided on the anchor ring 14b where such anchor ring and trim member meet and this aids in cutting off the trim member 6b where the trim member is molded as a unit onto the anchor ring 14b. Such shoulder 31 may simulate a wheel flange edge, as the rib 62 shown in Fig. 7.

Yet a further style of assembly of the invention is shown in Fig. 5, and a novel engagement is shown between a trim member 6c and an anchor ring 14c in this embodiment of the invention. The anchor ring 14c has a doubled back end section 40 which extends in a radially inwardly extending direction from the radially outer edge of the anchor ring and is spaced therefrom. This doubled back section 40 is on the axially inner surface of the anchor ring 14c. It will be seen that by molding the trim member 6c around this anchor ring 14c and the doubled back terminal section 40 thereof, a very desirable mechanical interlock will be secured between these members because of this shape of the section 40. Furthermore, any chemical or other mechanical interlock or bond between the two members will aid in providing the unitary construction desired with a strong bond between the trim member and anchor ring assembly. The trim member 6c extends radially inwardly a short distance beyond the end of the section 40.

Reference also is made to the structure shown in Fig. 6 of the drawings wherein a trim member 6d is provided and engages an anchor ring 14d. In this instance, the radially outer end of the anchor ring has an overhanging generally radially outwardly extending edge flange 50 provided thereon. This overhanging edge flange 50 provides a very sturdy mechanical interlock and bond between the trim member 6d and the anchor ring and renders the unit formed thereby a sturdy structure which will give good service life. It should be noted that preferably a rib 51 is provided on the trim member 14d and with the edge flange 50 partially extending into the base portion of such rib. By providing a radially inwardly extending section 52 on the trim member 14d on the inner surface of the anchor ring, this prevents any possible metal-to-metal contact between the anchor ring and wheel flange, assuming that the anchor ring is made from metal. Such a structure also aids in effectively embedding the edge flange 50 in the material used in forming the trim member 14d.

The structure shown in Fig. 7 uses a novel anchor clip 7e therein and this clip has an axially inner wall 60 formed from a pair of flattened layers or convolutions formed in the material, such as metal, from which the clip is made. It will be noted that the radially outer end of such inner wall 60 is made to engage the radially inner surface of the wheel flange 5e and aids in securing the clip 7e thereto. The radially inner portion of this inner wall 60 may extend axially inwardly of the wheel assembly, as at 61, so as to aid in spacing the inner wall 60 from the associated wheel flange to limit the arcuate movement of the clips 7e about the wheel flange 5e. Preferably an anchor ring 14e in this embodiment of the invention is provided with an axially outwardly extending edge rib or bead 62 to simulate an edge of a wheel flange. This makes trim member 6e provide a more natural appearance like that formed between a conventional tire sidewall and an asociated wheel flange. Usually the trim member 6e would be integrally molded with the anchor ring 14e and the trim member material would flow out and occupy the inner portion of the bead 62, as well as to embed a radially outer portion 63 of the anchor ring 14e in the trim member. This provides both a mechanical and any other desired type of a bond between the trim member and anchor ring to make a sturdy, unitary assembly thereof.

Still another type of a novel positioning clip 7f is shown in Fig. 8 of the drawings and it operatively positions a trim member 6f by an anchor ring 14f. The trim member and anchor ring preferably are of a unitary or integral assembly. In this instance, the clip 7f has an axially inner wall 9f that is formed from a plurality, such as three, flattened layers or convolutions of the material from which the clip is made and preferably all of these layers are spaced slightly from each other and provide resiliency in the clip against any axially inwardly directed forces applied to the clip when engaged with a wheel flange. The upper ends of these inner walls 9f resiliently engage the wheel flange 5f and aid in maintaining the clips on such wheel flange when forced thereon. An important feature of this anchor ring 14f is that the radially outer end thereof is bent or shaped to form a shoulder 71 that extends axially inwardly of the tire and wheel assembly. The remaining section of the anchor ring 14f extends radially outwardly of the tire and wheel assembly a short distance from the shoulder 71 and is folded back upon itself at 72 to provide an end portion on the anchor ring that extends radially inwardly of the shoulder 71. Thus again, a mechanical molded interlock is provided between the trim member 6f and the anchor ring 14f. Preferably the trim member 6f extends radially inwardly of the anchor ring a short distance and tapers off to a point as indicated at 73 which would lie against the axially inner surface of the anchor ring 14f and be suitably bonded or secured thereto.

Fig. 9 of the drawings is another view showing the construction in general as shown in Fig. 2. Thus, in this instance, the anchor ring 14 is provided with a plurality of apertures 80 therein so that the trim member 6, when molded around the anchor ring, can have portions thereof flow through and occupy such apertures 80 to effect the desired mechanical bond and/or interlock between the trim member and the anchor ring. If rubber is used to form the trim member, a vulcanized bond can be secured between such member and the anchor ring, if desired.

Yet another feature of the invention which can be used in any of the anchor rings thereof, as desired, is that a plurality of splits or slits, indicated at 90, in Fig. 8 of the drawings, can be provided in only the radially inner section of the anchor ring. These splits or slits 90 would be formed at, for example, six equally circumferentially spaced portions of the anchor ring, usually adjacent the clips provided in the assembly so that it would facilitate the springing of the radially inner edge of the anchor ring over these clips. This permits ready assembly and disassembly of the trim member with relation to the clips, and the tire and wheel assembly with which they are engaged.

It should be understood that the molded shape of the trim members as shown herein may differ appreciably from the operative positions of the trim members indicated. That is, the trim members are so initially contoured by the molding action as to have a shape which provides inherent stresses in the resilient trim members when moved to the positions taken when operatively engaged with a tire sidewall. Thus the trim members normally are initially curved so as to extend appreciably axially inwardly of the positions shown herein, when the radially inner portions thereof would engage a wheel flange, so that the tire sidewall forces the radially outer portion of the trim members axially outwardly and builds up resilient, inherent stresses in the trim members. Such stresses aid in holding such members in the desired hugging or resilient engagement with the tire sidewall for the entire life of the trim member. Also, it should be understood that the trim members can be provided with a rib, as shown in Fig. 9, at the radially outer edge thereof, or the entire radial length of the trim member can be of generally tapered shape without any ribs on the outer surface thereof.

It also should be realized that in the anchor ring, as shown in Fig. 4, it can have ribs or corrugations provided thereon to aid in obtaining a good mechanical bond between the trim member and anchor ring. Of course, such anchor ring also would normally have apertures, slots or other means therein to facilitate a good mechanical bond between the anchor ring and trim member.

The unitary construction or assembly of the trim members and anchor rings of the invention facilitate the attachment or removal of such unit by springing radially inner sections of the anchor ring to or from engagement with the positioning clips provided. The inherent resiliency of the clips themselves, especially of the clips 7e and 7f, permits the clips to pivot around the wheel flange or to be compressed axially or radially slightly so that the anchor ring inner end may engage or be disengaged from said clips, as desired. Possibly the clips themselves may be sprung from a wheel flange to remove the assembly from the wheel.

The anchor rings would be completed prior to molding or securing a trim member thereto. If the rings are made from metal strips, the strip ends can be secured together, for example, by welding, mechanical interlock or otherwise, as desired. It also is possible to secure the strip ends together in an anchor ring by the resilient material forming the trim member by molding such trim material around at least parts of the anchor ring ends. Such latter construction would provide desirable expansion characteristics in the anchor ring and enable it to be sprung readily over the positioning clips.

Fig. 10 of the drawings shows yet a further modified style of a trim member assembly of the invention. Thus in this instance, a resilient member 6g of the invention is positioned by means of an anchor ring 14g that in turn is positioned on a suitable wheel flange 5g by means of clips 7g similar to the clips 7e shown in Fig. 7 or as in any other figures of the drawings. One special feature of this anchor ring 14g is that it has an axially inwardly extending shoulder or flange 89 that terminates in a radially outwardly extending edge flange 81 at the radially outer portion of the ring. The drawing clearly shows that substantially all of this flange 89 and edge flange 81 are embedded in the trim member 6g while the entire flange could be so embedded if desired. Thus the trim member 6g could be initially molded to receive the flanges 89 and 81 therein by providing a complementary contoured recess in the trim member, or the trim member could be initially molded around these flanges 89 and 81, as desired. Obviously the radial length of the trim member 6g radially inwardly with relation to the flange 8g of the anchor ring 14g can be varied, as desired. Furthermore, this trim member 6g can be vulcanized, or cemented to the anchor ring 14g, when such types of bonds are appropriate.

It will be realized that any of the other trim member means of the invention, and especially the structures shown in Figs. 2, 6, 7 and 10 of the drawings, could be initially molded with proper contours or recesses therein for receiving and mechanically engaging the edge flange means provided on the anchor rings.

Preferably the anchor rings and trim member means shown in Figs. 3 and 4 of the drawings would always be made into an integral unit by some type of a molding action so that an effective mechanical or vulcanized or other interlock or bond is secured between such trim member and the preformed anchor ring so that a unitary end construction is provided. This insures positive or fixed engagement between the anchor ring and trim member and maintains such trim member in permanent operative position and engagement with such anchor ring. Mounting of the apparatus on a wheel flange is thus facilitated.

It will be understood that in any instance wherein a trim member is molded around an anchor ring, then the embedded portions of the anchor ring may have slots or apertures cut therein or have corrugated zones provided therein to better the mechanical bond of the material forming the trim member as it flows around such slots, apertures or corrugations in the anchor ring to effect the desired interlock therebetween when the trim member is initially formed. Such mechanical bond is in addition to any chemical or vulcanization bond obtained.

From the foregoing, it will be seen that a novel and attractive type of a unitary trim member and anchor ring assembly has been provided by the invention and that the attachment of the novel trim member means or unit of the invention of a tire and wheel assembly is facilitated.

It will be understood that in general, the curvature of the radially inner ends of the clips of the invention is generally a little sharper than the radially inner ends of the anchor rings and the curvature provided in such axially inwardly extending section of the anchor rings facilitates the resilient but positive engagement of the inner ends of the anchor rings with the radially inner ends of these positioning clips.

From the foregoing, it will be seen that the objects of the invention have been secured.

While several complete embodiments of the invention have been disclosed herein, it will be appreciated that modification of these particular embodiments of the invention may be resorted to without departing from the scope of the invention as defined in the appended claims.

What is claimed is:

1. Apparatus for decorating and protecting tire sidewalls in a tire and wheel assembly which apparatus comprises a plurality of clips having axially inner and axially outer walls with said axially outer walls having flanges thereon, said axially outer wall flanges extending axially of the clip beyond said axially inner walls for engaging a wheel flange to extend generally radially inwardly therefrom, a resilient trim member for lying against a tire sidewall, and an anchor ring having an axially inwardly extending radially inner section to engage the radially inner ends of said clips when operatively positioned to be secured against the wheel flange of a tire and wheel assembly thereby, said anchor ring extending radially outwardly of said clips and engaging and positioning said trim member.

2. Apparatus as in claim 1 wherein said trim member and anchor ring are mechanically interlocked and secured together.

3. Apparatus as in claim 1 wherein said trim member extends radially inwardly of a wheel flange edge on the axially outer surface thereof, when engaged therewith, to attempt to simulate a smaller diameter wheel assembly and is secured to said anchor ring radially inwardly of such wheel flange edge.

4. Apparatus for decorating and protecting tire sidewalls in a tire and wheel assembly which apparatus comprises a plurality of clips having axially inner and axially outer walls with said axially outer walls having flanges thereon, said axially outer wall flanges extending axially of the clip beyond said axially inner walls for engaging a wheel flange to extend generally radially inwardly therefrom, a resilient trim member for engaging a tire sidewall, and an anchor ring having an axially inwardly extending radially inner section to engage the radially inner ends of said clips when operatively positioned to be secured to a tire and wheel assembly thereby, said anchor ring extending radially outwardly and having a doubled back radially outer end section being embedded in said trim member to form a unit from said anchor ring and trim member.

5. Apparatus for decorating and protecting tire sidewalls in a tire and wheel assembly which apparatus comprises a plurality of clips having axially inner and axially outer walls with said axially outer walls having flanges thereon, said axially outer wall flanges extending axially of the clip beyond said axially inner walls for engaging a wheel flange to extend generally radially inwardly therefrom, a resilient trim member for engaging a tire sidewall, and an anchor ring having an axially inwardly extending radially inner section to engage the radially inner ends of said clips when operatively positioned to be secured to a tire and wheel assembly thereby, said anchor ring extending radially outwardly to engage said trim member by an edge flange at the radially outer end of said anchor ring, said trim member having an axially inwardly extending rib for engaging the radially inner surface of a wheel flange when positioned on a tire and wheel assembly.

6. Apparatus for decorating and protecting tire sidewalls in a tire and wheel assembly which apparatus comprises a plurality of clips each having axially inner and axially outer walls with each clip having a generally axially inwardly extending flange formed on the radially outer portion of said axially outer wall engaging a wheel flange to extend generally radially inwardly therefrom, a resilient trim member engaging a tire sidewall, and an anchor ring having a generally axially inwardly extending radially inner section to engage the radially inner ends of said clips resiliently to be secured to a tire and wheel assembly thereby, said anchor ring extending radially outwardly and having a flanged end section embedded in said trim member at a distance radially inwardly of the edge of a wheel flange.

7. Apparatus for decorating and protecting tire sidewalls in a tire and wheel assembly which apparatus comprises a plurality of clips for engaging a wheel flange edge to extend generally radially inwardly therefrom, a resilient trim member for engaging a tire sidewall, and an anchor ring having an axially inwardly extending radially inner section to engage the radially inner ends of said clips when operatively positioned to be secured to a tire and wheel assembly thereby, said anchor ring having a shoulder thereon and an axially inwardly offset radially outwardly section extending beyond said shoulder to engage and position said trim member, said radially outwardly extending section being embedded in said trim member and having a doubled back end portion extending radially inwardly of said shoulder and embedded in said trim member for a mechanical interlock therewith.

8. Apparatus for decorating and protecting tire sidewalls in a tire and wheel assembly, which apparatus comprises a plurality of clips having axially inner and axially outer walls with said axially outer walls having flanges thereon, said axially outer wall flanges extending axially of the clip beyond said axially inner walls for engaging a wheel flange to extend generally radially inwardly therefrom and having arcuate radially inner ends, a resilient trim member for engaging a tire sidewall, and an anchor ring having an arcuate axially inwardly extending radially inner section to engage the radially inner ends of said clips by being sprung or worked thereover when operatively positioned to be secured to a tire and wheel assembly thereby, said anchor ring extending radially outwardly to engage said trim member by an edge flange extending axially inwardly and then radially outwardly at the radially outer end of said anchor ring, said trim member having a recess molded therein of complementary shape to said anchor ring flange to form a mechanical interlock therebetween.

9. Apparatus in claim 1 wherein said trim member is adapted to extend radially inwardly of a wheel flange edge and where said trim member has an annular circumferentially extending radially directed slot in its radially inner portion open towards the axis of the tire, a portion of said anchor ring being embedded in said slot in said trim member to position said trim member on said anchor ring.

References Cited in the file of this patent
UNITED STATES PATENTS 2,749,186     Wood ------------------ June 5, 1956

FOREIGN PATENTS 1,061,278     France ---------------- Nov. 25, 1953